United States Patent
Tsuda

(10) Patent No.: US 12,431,797 B2
(45) Date of Patent: Sep. 30, 2025

(54) VOLTAGE CONVERSION SYSTEM, POWER CONVERTER SYSTEM, AND VOLTAGE CONVERSION METHOD

(71) Applicant: Murata Manufacturing Co., Ltd., Nagaokakyo (JP)

(72) Inventor: Kazunori Tsuda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 34 days.

(21) Appl. No.: 18/603,331

(22) Filed: Mar. 13, 2024

(65) Prior Publication Data

US 2024/0223078 A1 Jul. 4, 2024

Related U.S. Application Data

(63) Continuation of application No. PCT/JP2022/032729, filed on Aug. 31, 2022.

(30) Foreign Application Priority Data

Oct. 4, 2021 (JP) .................. 2021-163327

(51) Int. Cl.
   *H02M 1/32* (2007.01)
   *H02M 1/00* (2006.01)
   *H02M 3/07* (2006.01)

(52) U.S. Cl.
   CPC ........... *H02M 3/07* (2013.01); *H02M 1/0067* (2021.05); *H02M 1/32* (2013.01)

(58) Field of Classification Search
   CPC ......... H02M 1/0067; H02M 1/32; H02M 3/07

USPC ........................................... 327/536
   See application file for complete search history.

(56) References Cited

U.S. PATENT DOCUMENTS

| | | | |
|---|---|---|---|
| 2002/0154524 A1 | 10/2002 | Yamanaka et al. | |
| 2009/0121781 A1 | 5/2009 | Oyama et al. | |
| 2012/0268096 A1 | 10/2012 | Kawasoe | |
| 2018/0019669 A1* | 1/2018 | Zhang | H02M 3/07 |
| 2019/0379287 A1* | 12/2019 | Zhang | H02M 3/07 |
| 2022/0278611 A1* | 9/2022 | Tsuda | H02M 1/007 |

(Continued)

FOREIGN PATENT DOCUMENTS

| | | | |
|---|---|---|---|
| JP | 2003018822 A | 1/2003 | |
| JP | 2009081984 A | 4/2009 | |

(Continued)

OTHER PUBLICATIONS

International Search Report in PCT/JP2022/032729, mailed Oct. 18, 2022, 3 pages.

(Continued)

*Primary Examiner* — William Hernandez
(74) *Attorney, Agent, or Firm* — Keating & Bennett, LLP

(57) ABSTRACT

A voltage conversion system includes a capacitive voltage converter including at least one flying capacitor and switches, a controller configured or programmed to perform switching operations of the switches, and a balance circuit to perform charge-and-discharge control of at least one flying capacitor such that the charge voltage of at least one flying capacitor matches a target charge voltage corresponding to an input voltage or an output voltage. The controller is configured or programmed to perform the switching operations of the switches when the charge voltage matches the target charge voltage.

19 Claims, 8 Drawing Sheets

(56) References Cited

U.S. PATENT DOCUMENTS

2023/0378872 A1\* 11/2023 Choi ..................... H02M 3/158
2024/0250609 A1\* 7/2024 Concklin ................ H02M 1/36

FOREIGN PATENT DOCUMENTS

| JP | 2009124824 A | 6/2009 |
| JP | 2010104140 A | 5/2010 |
| JP | 2012226572 A | 11/2012 |

OTHER PUBLICATIONS

Written Opinion in PCT/JP2022/032729, mailed Oct. 18, 2022, 3 pages.

\* cited by examiner

VOLTAGE CONVERSION SYSTEM, POWER CONVERTER SYSTEM, AND VOLTAGE CONVERSION METHOD

CROSS REFERENCE TO RELATED APPLICATIONS

This application claims the benefit of priority to Japanese Patent Application No. 2021-163327 filed on Oct. 4, 2021 and is a Continuation Application of PCT Application No. PCT/JP2022/032729 filed on Aug. 31, 2022. The entire contents of each application are hereby incorporated herein by reference.

BACKGROUND OF THE INVENTION

1. Field of the Invention

The present invention relates to voltage conversion systems, power converter systems, and voltage conversion methods for converting an input voltage into an output voltage.

2. Description of the Related Art

Japanese Unexamined Patent Application Publication No. 2003-018822 and Japanese Unexamined Patent Application Publication No. 2012-226572 describe a DC-DC converter, such as a charge pump, that converts an input voltage into an output voltage. For example, when a capacitor connected to an output terminal is not charged at the activation of the charge pump, a large electric current (inrush current) flows momentarily to charge the capacitor. In this context, Japanese Unexamined Patent Application Publication No. 2003-018822 discloses a technology to prevent the occurrence of an inrush current by charging a capacitor connected to an output terminal to a target voltage by using a constant-current circuit connected in parallel with a charge pump. Also, Japanese Unexamined Patent Application Publication No. 2012-226572 discloses a technology for suppressing the occurrence of an inrush current by limiting the electric current using a regulator until a predetermined time passes after the activation of the charge pump.

SUMMARY OF THE INVENTION

However, with the technologies disclosed in Japanese Unexamined Patent Application Publication No. 2003-018822 and Japanese Unexamined Patent Application Publication No. 2012-226572, when a flying capacitor inside of a capacitive voltage converter, such as a charge pump, has not been charged to an ideal voltage, an inrush current flows from an input terminal side or an output terminal side toward the flying capacitor inside of the capacitive voltage converter. Also, when the potential difference between multiple flying capacitors inside of a capacitive voltage converter is large, an inrush current may flow between the multiple flying capacitors. Such an inrush current may destabilize the operation of the capacitive voltage converter and may cause an overvoltage to be applied to internal elements of the capacitive voltage converter.

Example embodiments of the present invention provide, for example, voltage conversion systems that each can reduce or prevent the occurrence of an inrush current in a capacitive voltage converter.

A voltage conversion system according to an aspect of an example embodiment of the present invention to convert an input voltage input to an input terminal into an output voltage to be output from an output terminal includes a capacitive voltage converter on a path connecting the input terminal to the output terminal and including at least one flying capacitor and multiple switches, a controller configured or programmed to perform switching operations of the multiple switches, and a balance circuit to perform charge-and-discharge control of at least one flying capacitor such that the charge voltage of at least one flying capacitor matches a target charge voltage corresponding to the input voltage or the output voltage. The controller configured or programmed to perform the switching operations of the multiple switches when the charge voltage matches the target charge voltage.

A power converter system according to an aspect of an example embodiment of the present invention includes the voltage conversion system and another voltage conversion system.

A voltage conversion method according to an aspect of an example embodiment of the present invention is performed by a voltage conversion system to convert an input voltage input to an input terminal into an output voltage to be output from an output terminal. The voltage conversion system includes a capacitive voltage converter on a path connecting the input terminal to the output terminal and including at least one flying capacitor and multiple switches. The voltage conversion method includes performing charge-and-discharge control of at least one flying capacitor such that the charge voltage of at least one flying capacitor matches a target charge voltage corresponding to the input voltage or the output voltage and performing the switching operations of the multiple switches when the charge voltage matches the target charge voltage.

Example embodiments of the present invention make it possible to reduce or prevent the occurrence of an inrush current in a capacitive voltage converter.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
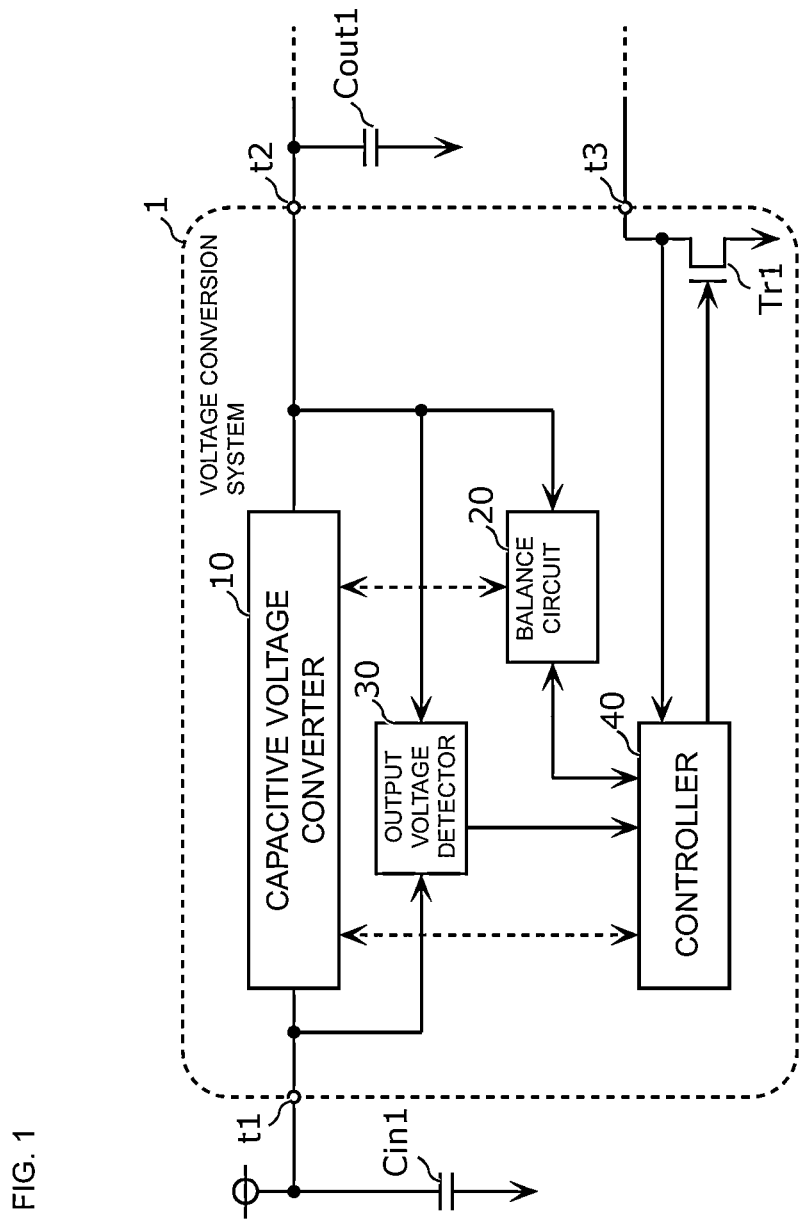
FIG. 1 is a diagram illustrating an example of a voltage conversion system according to a first example embodiment of the present invention.

Example embodiments of the present invention are described in detail below with reference to the drawings. Each of the example embodiments described below represents a general or specific example. Values, shapes, materials, components, and the layouts and connection configurations of the components described in the example embodiments below are just examples and are not intended to limit the present invention. Among the components in the example embodiments below, components not described in independent claims are optional. Also, the sizes or the ratios of sizes of components illustrated in the drawings are not necessarily accurate. In the drawings, the same reference number is assigned to substantially the same components, and overlapping descriptions of those components are omitted or simplified. Furthermore, in the example embodiments below, "connected" not only indicates that elements are directly connected to each other but also indicates that the elements are electrically connected to each other via another element.

First Example Embodiment

A first example embodiment is described with reference to FIGS. 1 to 7.

FIG. 1 is a diagram illustrating an example of a voltage conversion system 1 according to the first example embodiment.

The voltage conversion system 1 converts an input voltage input to an input terminal t1 into an output voltage to be output from an output terminal t2 and includes a DC-DC converter, such as a charge pump. For example, the voltage conversion system 1 may be a step-up converter that outputs an output voltage obtained by increasing an input voltage or may be a step-down converter that outputs an output voltage obtained by decreasing an input voltage. The voltage conversion system 1 includes a capacitive voltage converter 10, a balance circuit 20, an output voltage detector 30, a controller 40, an input terminal t1, an output terminal t2, and a flag terminal t3. Furthermore, the voltage conversion system 1 includes a transistor Tr1.

The input terminal t1 is connected to, for example, a direct-current power source and receives an input voltage. A capacitor Cin1 is charged to the input voltage.

The output terminal t2 is connected to, for example, a load, and an output voltage is output from the output terminal t2. A capacitor Cout1 is charged to the output voltage.

The flag terminal t3 is connected to, for example, another voltage conversion system.

The transistor Tr1 is provided on a path connecting the flag terminal t3 to the ground. The transistor Tr1 is, for example, a metal oxide semiconductor field effect transistor (MOSFET) the gate of which is connected to the controller 40. The transistor Tr1 controls the flag terminal t3 to transition to a predetermined state.

The capacitive voltage converter 10 is provided on a path connecting the input terminal t1 to the output terminal t2 and is a circuit including at least one flying capacitor and multiple switches. The capacitive voltage converter 10 is a charge pump, such as a Dickson charge pump. The capacitive voltage converter 10 is, for example, a step-down charge pump that outputs the output voltage obtained by decreasing the input voltage. However, the capacitive voltage converter 10 may instead be a step-up charge pump. An example of a circuit configuration of the capacitive voltage converter 10 is described with reference to FIG. 2.

Figure 2:
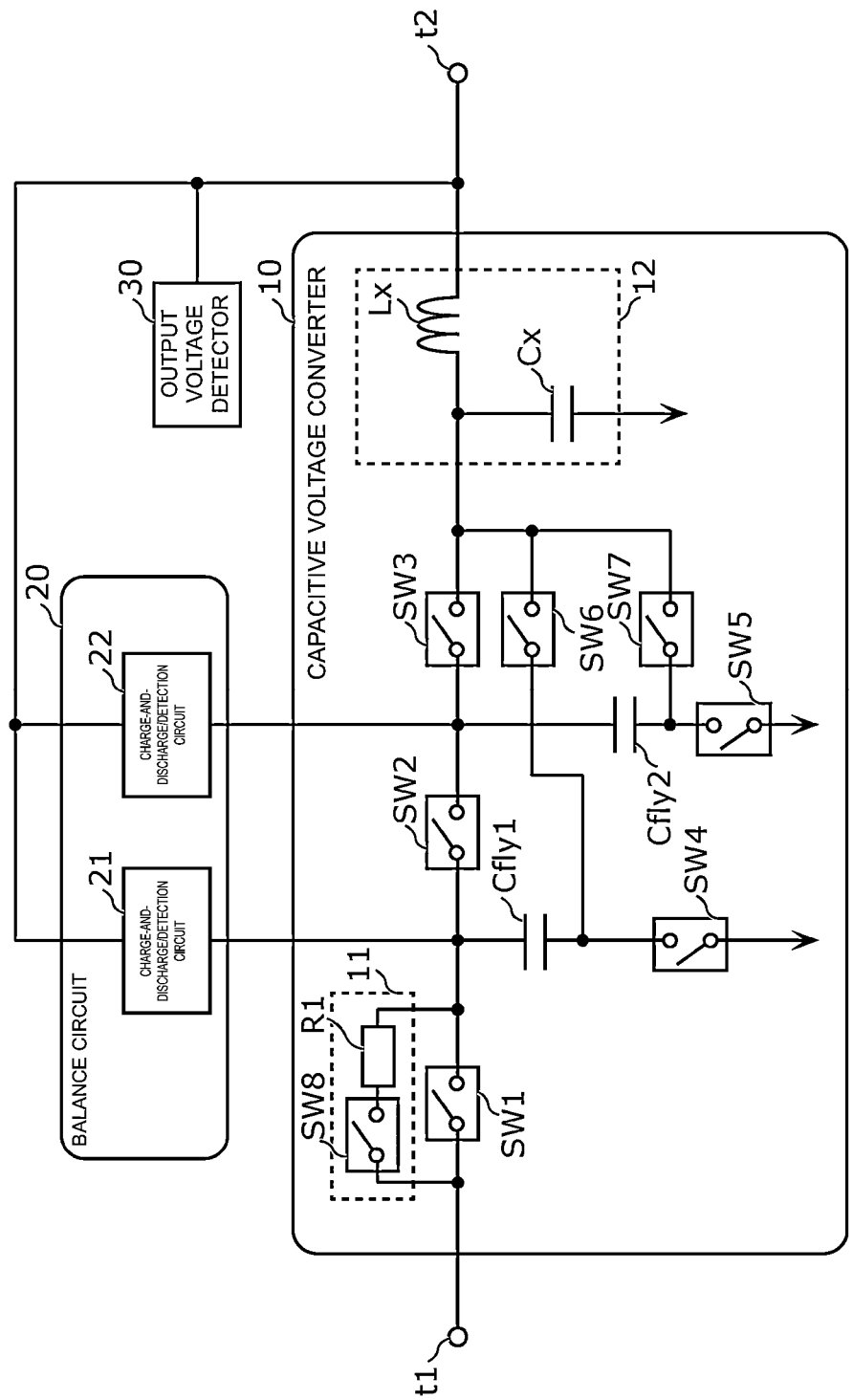
FIG. 2 is a circuit diagram illustrating an example of a capacitive voltage converter according to the first example embodiment of the present invention.

FIG. 2 is a circuit diagram illustrating an example of the capacitive voltage converter 10 according to the first example embodiment. FIG. 2 illustrates the balance circuit 20 and the output voltage detector 30 in addition to the capacitive voltage converter 10 and also illustrates the connection among the capacitive voltage converter 10, the balance circuit 20, and the output voltage detector 30.

The capacitive voltage converter 10 includes multiple switches, such as switches SW1 to SW7. The number of switches included in the capacitive voltage converter 10 is not limited to this example, and the capacitive voltage converter 10 may include any number of switches corresponding to the number of, for example, flying capacitors. Also, as at least one flying capacitor, the capacitive voltage converter 10 includes, for example, flying capacitors Cfly1 and Cfly2. The number of at least one flying capacitor included in the capacitive voltage converter 10 is not limited to two and may be one or three or more.

Also, the capacitive voltage converter 10 includes a current limiting circuit that limits an input current flowing from the input terminal t1 to the capacitive voltage converter 10 or an output current flowing from the capacitive voltage converter 10 to the output terminal t2. In this example, the capacitive voltage converter 10 includes a current limiting circuit 11 that limits the input current.

Also, the capacitive voltage converter 10 includes an inductive filter connected to the input terminal t1 or the output terminal t2. When the input voltage is less than the output voltage, that is, when the capacitive voltage converter 10 is a step-up charge pump, the capacitive voltage converter 10 includes an inductive filter connected to the input terminal t1. When the output voltage is less than the input voltage, that is, when the capacitive voltage converter 10 is a step-down charge pump, the capacitive voltage converter 10 includes an inductive filter connected to the output terminal t2. In this example, the capacitive voltage converter 10 is a step-down charge pump and therefore includes an inductive filter 12 connected to the output terminal t2.

The switch SW1 is provided on a path connecting the input terminal t1 to the output terminal t2 and includes a first end connected to the input terminal t1 and a second end connected to the switch SW2.

The switch SW2 is provided on the path connecting the input terminal t1 to the output terminal t2 and includes a first end connected to the switch SW1 and a second end connected to the switch SW3.

The switch SW3 is provided on the path connecting the input terminal t1 to the output terminal t2 and includes a first end connected to the switch SW2 and a second end connected to the output terminal t2 (more specifically, connected to the output terminal t2 via the inductive filter 12).

The switch SW4 is provided on a path connecting a path between the switch SW1 and the switch SW2 to the ground and includes a first end connected via the flying capacitor Cfly1 to the path between the switch SW1 and the switch SW2 and a second end connected to the ground.

The switch SW5 is provided on a path connecting a path between the switch SW2 and the switch SW3 to the ground and includes a first end connected via the flying capacitor Cfly2 to the path between the switch SW2 and the switch SW3 and a second end connected to the ground.

The switch SW6 is provided on a path connecting a path between the switch SW3 and the output terminal t2 to the ground and includes a first end connected to the path between the switch SW3 and the output terminal t2 (more specifically, the inductive filter 12) and a second end connected via the switch SW4 to the ground.

The switch SW7 is provided on a path connecting a path between the switch SW3 and the output terminal t2 to the ground and includes a first end connected to the path between the switch SW3 and the output terminal t2 (more specifically, the inductive filter 12) and a second end connected via the switch SW5 to the ground.

The flying capacitor Cfly1 is provided on the path connecting the path between the switch SW1 and the switch SW2 to the ground and includes a first end connected to the path between the switch SW1 and the switch SW2 and a second end connected via the switch SW4 to the ground.

The flying capacitor Cfly2 is provided on the path connecting the path between the switch SW2 and the switch SW3 to the ground and includes a first end connected to the path between the switch SW2 and the switch SW3 and a second end connected via the switch SW5 to the ground.

The first end of the flying capacitor Cfly1 is connected to a charge-and-discharge/detection circuit 21 of the balance circuit 20, and the first end of the flying capacitor Cfly2 is connected to a charge-and-discharge/detection circuit 22 of the balance circuit 20.

The current limiting circuit 11 is connected in parallel with the switch SW1. The current limiting circuit 11 includes, for example, a switch SW8 and a resistor R1 that are connected in series with each other. The switch SW8 includes a first end connected to the first end of the switch SW1 and a second end connected to a first end of the resistor R1. The switch SW8 may be one of multiple switches included in the capacitive voltage converter 10. That is, the multiple switches may be the switches SW1 to SW8. The resistor R1 includes the first end connected to the second end of the switch SW8 and a second end connected to the second end of the switch SW1. When the switch SW8 is switched to the conductive state, the input current flowing from the input terminal t1 into the capacitive voltage converter 10 is limited by the resistor R1. Here, the method of limiting the electric current with the current limiting circuit 11 is not limited to a method using a circuit in which a switch and a resistor are connected in series with each other, but may also be a method in which the resistance is equivalently increased using, for example, a regulator.

The switches SW1 to SW8 are, for example, semiconductor switches and are controlled (switched between the conductive state and the non-conductive state) by control signals from the controller 40.

The inductive filter 12 includes an inductor Lx and a capacitor Cx. The inductor Lx is provided on the path connecting the input terminal t1 to the output terminal t2 and includes a first end connected to the switch SW3 and a second end connected to the output terminal t2. The capacitor Cx is provided on a path connecting a path between the switch SW3 and the inductor Lx to the ground and includes a first end connected to the path between the switch SW3 and the inductor Lx and a second end connected to the ground. The inductive filter 12 reduces or prevents a current spike between the capacitive voltage converter 10 and the capacitor Cout1 (specifically, the peak of an electric current flowing between the capacitive voltage converter 10 and the capacitor Cout1). For example, the capacitance value of the capacitor Cx is less than or equal to 1/10 of the capacitance value of the capacitor Cout1.

Details of the operation of the capacitive voltage converter 10 (specifically, the operation of the controller 40) are described later.

The balance circuit 20 performs charge-and-discharge control of the flying capacitors Cfly1 and Cfly2 such that charge voltages of the flying capacitors Cfly1 and Cfly2 become target charge voltages corresponding to the input voltage or the output voltage. For example, the balance circuit 20 performs the charge-and-discharge control of the flying capacitors Cfly1 and Cfly2 in a state in which the switching operations of the switches SW1 to SW8 are not being performed. In this example, the balance circuit 20 performs the charge-and-discharge control of the flying capacitors Cfly1 and Cfly2 in a state in which the switching operations of the switches SW1 to SW8 are not being performed such that the charge voltages of the flying capacitors Cfly1 and Cfly2 match the target charge voltages corresponding to the output voltage. The balance circuit 20 includes the charge-and-discharge/detection circuits 21 and 22. An example of a circuit configuration of the balance circuit 20 is described with reference to FIG. 3.

Figure 3:
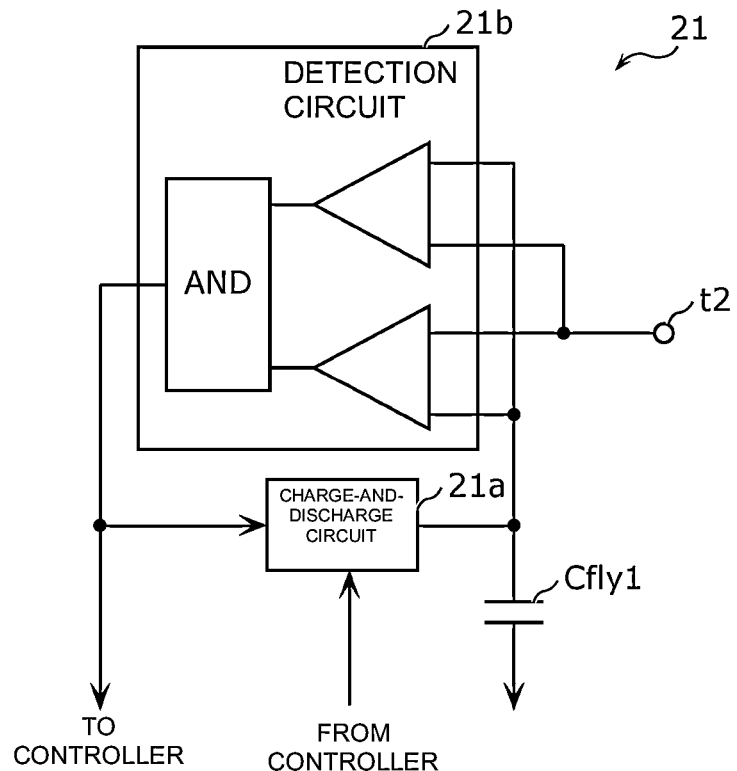
FIG. 3 is a circuit diagram illustrating an example of a balance circuit according to the first example embodiment of the present invention.

FIG. 3 is a circuit diagram illustrating an example of the balance circuit 20 according to the first example embodiment. FIG. 3 illustrates the circuit configuration of the charge-and-discharge/detection circuit 21 among the charge-and-discharge/detection circuits 21 and 22 included in the balance circuit 20. In addition to the charge-and-discharge/detection circuit 21, FIG. 3 illustrates the flying capacitor Cfly1 connected to the charge-and-discharge/detection circuit 21. Because the charge-and-discharge/detection circuit 21 and the charge-and-discharge/detection circuit 22 have substantially the same circuit configuration, the illustration of the circuit configuration of the charge-and-discharge/detection circuit 22 is omitted.

The charge-and-discharge/detection circuit 21 includes a charge-and-discharge circuit 21a and a detection circuit 21b.

The charge-and-discharge circuit 21a starts the charge-and-discharge control of the flying capacitor Cfly1 in response to an instruction from the controller 40. The charge-and-discharge circuit 21a ends the charge-and-discharge control of the flying capacitor Cfly1 when receiving, from the detection circuit 21b, a signal indicating that the charging and discharging of the flying capacitor Cfly1 has been completed. The charge-and-discharge circuit 21a may use any appropriate method to charge and discharge the flying capacitor Cfly1.

The detection circuit 21b includes a window comparator implemented by first and second comparators and an AND circuit. A positive input terminal of the first comparator is connected to the output terminal t2, and a negative input terminal of the first comparator is connected to the first end of the flying capacitor Cfly1. A negative input terminal of the second comparator is connected to the output terminal t2, and a positive input terminal of the second comparator is connected to the first end of the flying capacitor Cfly1. Output terminals of the first and second comparators are connected to the AND circuit. The detection circuit 21b outputs a high signal when the charge voltage of the flying capacitor Cfly1 matches a target charge voltage corresponding to the output voltage (specifically, a voltage within plus or minus several percent (e.g., about 5%) of a voltage corresponding to the output voltage (e.g., a voltage that is two times greater than the output voltage)). Also, the detection circuit 21b outputs a low signal when the charge voltage of the flying capacitor Cfly1 does not match the target charge voltage corresponding to the output voltage. The detection circuit 21b outputs these signals to the charge-and-discharge circuit 21a and the controller 40. The charge-and-discharge circuit 21a ends the charge-and-discharge control of the flying capacitor Cfly1 when receiving the high signal from the detection circuit 21b. Although the target charge voltage is assumed to be a voltage within a specific voltage range in this example, the target charge voltage may be a specific voltage. In this case, the detection circuit 21b may be implemented by one comparator.

The charge-and-discharge/detection circuit 22 differs from the charge-and-discharge/detection circuit 21 in that the charge-and-discharge/detection circuit 22 is connected to the flying capacitor Cfly2 instead of the flying capacitor Cfly1. Also, for example, the target charge voltage for the charge voltage of the flying capacitor Cfly2 may be a voltage within plus or minus several percent (e.g., about 5%) of a voltage corresponding to the output voltage (e.g., a voltage that is the same as the output voltage). Other features of the charge-and-discharge/detection circuit 22 are the same as those of the charge-and-discharge/detection circuit 21, and therefore their descriptions are omitted here.

The output voltage detector 30 detects the output voltage. An example of a circuit configuration of the output voltage detector 30 is described with reference to FIG. 4.

Figure 4:
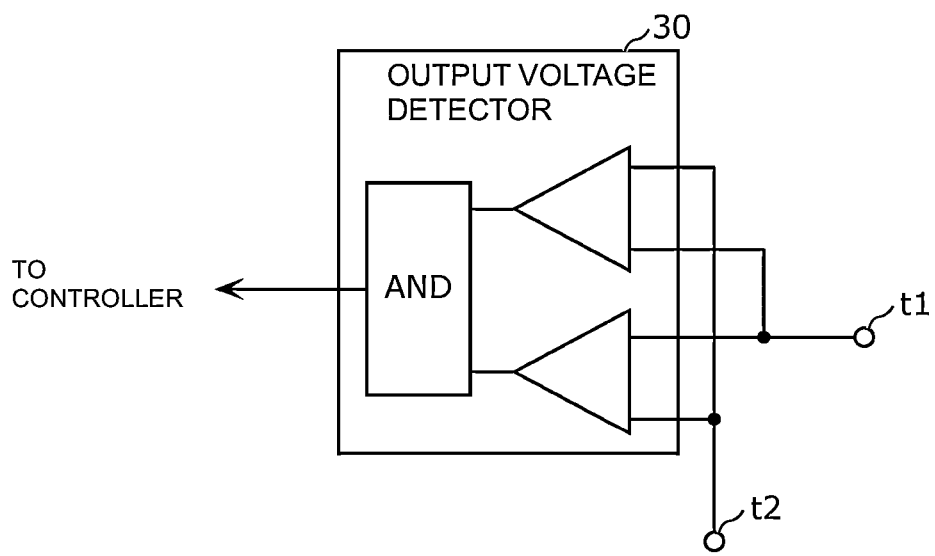
FIG. 4 is a circuit diagram illustrating an example of an output voltage detector according to the first example embodiment of the present invention.

FIG. 4 is a circuit diagram illustrating an example of the output voltage detector 30 according to the first example embodiment.

The output voltage detector 30 includes a window comparator implemented by first and second comparators and an AND circuit. A positive input terminal of the first comparator is connected to the input terminal t1, and a negative input terminal of the first comparator is connected to the output terminal t2. A negative input terminal of the second comparator is connected to the output terminal t2, and a positive input terminal of the second comparator is connected to the input terminal t1. Output terminals of the first and second comparators are connected to the AND circuit. The output voltage detector 30 outputs a high signal when the output voltage matches a target output voltage corresponding to the input voltage (specifically, a voltage within plus or minus several percent (e.g., about 5%) of a voltage corresponding to the input voltage (e.g., a voltage that is about ⅓ of the input voltage)). Also, the output voltage detector 30 outputs a low signal when the output voltage does not match the target output voltage corresponding to the input voltage. The output voltage detector 30 outputs these signals to the controller 40. Although the target output voltage is assumed to be a voltage within a specific voltage range in this example, the target output voltage may be a specific voltage. In this case, the output voltage detector 30 may be implemented by one comparator.

The controller 40 determines whether the charge voltages of the flying capacitors Cfly1 and Cfly2 match the target charge voltages. When it is determined that the charge voltages of the flying capacitors Cfly1 and Cfly2 match the target charge voltages, the controller 40 performs switching operations of the switches SW2 to SW8. When the capacitive voltage converter 10 does not include the current limiting circuit 11, the controller 40 performs switching operations of the switches SW1 to SW7. That is, when the capacitive voltage converter 10 includes the current limiting circuit 11, the switching operation of the switch SW8 is performed instead of the switching operation of the switch SW1. Details of the operation of the controller 40 are described later. For example, the voltage conversion system 1 may include a processor and a memory, and the processor may implement the controller 40 by executing a program stored in the memory. For example, the voltage conversion system 1 may include a microcomputer, and the controller 40 may be implemented by the microcomputer. Also, the controller 40 may be an integrated circuit, such as an application specific integrated circuit (ASIC).

Although the controller 40 is illustrated as an independent component in the voltage conversion system 1 in this example, the function of the controller 40 may be implemented by any of the components included in the voltage conversion system 1. For example, the capacitive voltage converter 10, the output voltage detector 30, or the balance circuit 20 may perform the functions of the controller 40.

Next, an operation of the voltage conversion system 1 is described with reference to FIG. 5.

Figure 5:
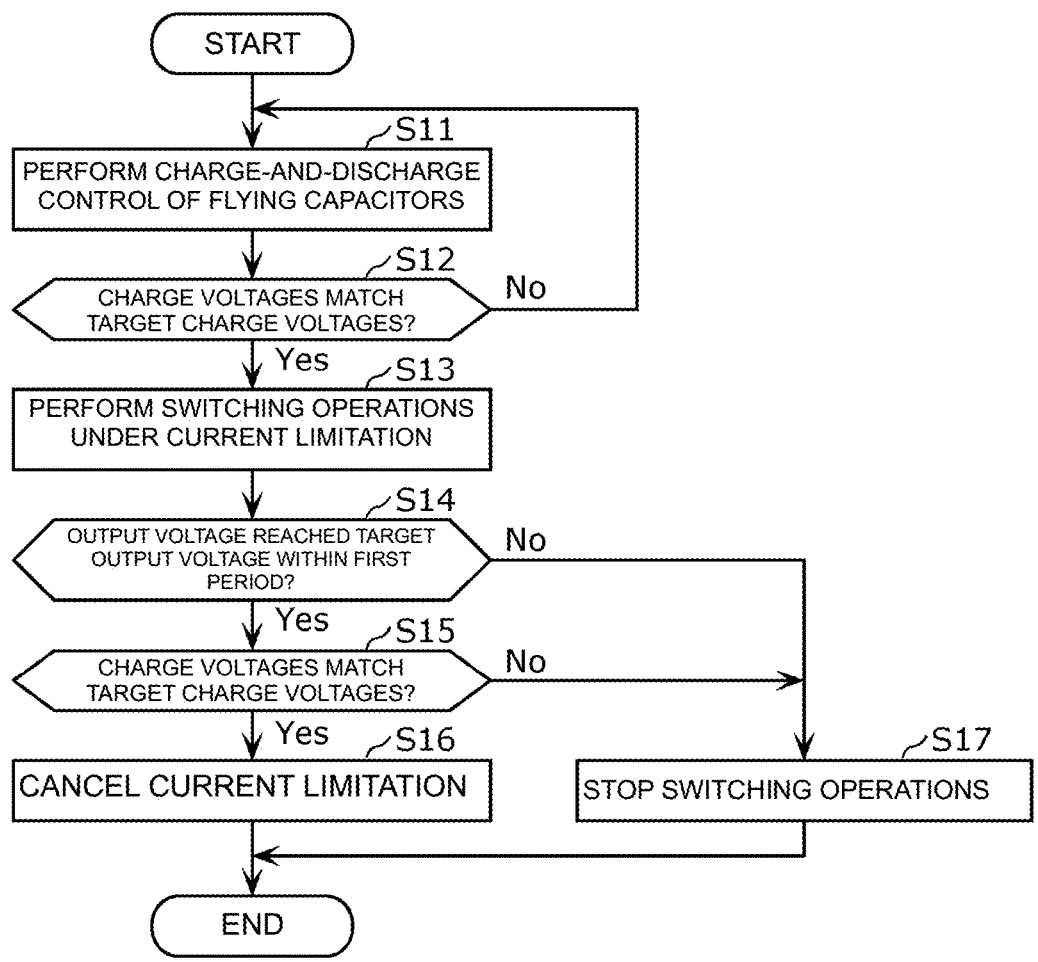
FIG. 5 is a flowchart illustrating an example of an operation of the voltage conversion system according to the first example embodiment of the present invention.

FIG. 5 is a flowchart illustrating an example of an operation of the voltage conversion system 1 according to the first example embodiment.

First, the balance circuit 20 performs the charge-and-discharge control of the flying capacitors Cfly1 and Cfly2 in a state in which the switching operations of switches SW1 to SW8 are not being performed such that the charge voltages of the flying capacitors Cfly1 and Cfly2 match the target charge voltages corresponding to the output voltage (step S11). For example, when the controller 40 transmits a signal to start the charge-and-discharge control to the balance circuit 20, the balance circuit 20 starts the charge-and-discharge control. Also, while the balance circuit 20 is performing the charge-and-discharge control, that is, until a signal indicating the completion of the charging and discharging of the flying capacitors Cfly1 and Cfly2 is received from the balance circuit 20, the controller 40 refrains from performing the switching operations of the switches SW1 to SW8. For example, the controller 40 maintains the switches SW1 to SW3 and switches SW6 to SW8 in the non-conductive state, and maintains the switches SW4 and SW5 in the conductive state. This enables the charge-and-discharge/detection circuit 21 of the balance circuit 20 to perform the charge-and-discharge control of the flying capacitor Cfly1 and enables the charge-and-discharge/detection circuit 22 of the balance circuit 20 to perform the charge-and-discharge control of the flying capacitor Cfly2.

Here, a switching operation refers to an operation in which a switch is switched between the conductive state and the non-conductive state at a specific switching frequency, and an operation in which a switch is maintained in the conductive state or the non-conductive state is not referred to as a switching operation.

Next, the controller 40 determines whether the charge voltages of the flying capacitors Cfly1 and Cfly2 match the target charge voltages (step S12). For example, in a Dickson charge pump with a division ratio of 3, the target charge voltage for the charge voltage of the flying capacitor Cfly1 is two times greater than the output voltage (specifically, a voltage within plus or minus several percent (e.g., about 5%) of the voltage that is two times greater than the output voltage), and the target charge voltage for the charge voltage of the flying capacitor Cfly2 is the same as the output voltage (specifically, a voltage within plus or minus several percent (e.g., about 5%) of the voltage that is the same as the output voltage). For example, the controller 40 can determine that the charge voltages of the flying capacitors Cfly1 and Cfly2 match the target charge voltages when receiving, from the balance circuit 20, a signal indicating that the charging and discharging of the flying capacitors Cfly1 and Cfly2 have been completed.

When it is determined that the charge voltages of the flying capacitors Cfly1 and Cfly2 do not match the target charge voltages (No at step S12), the controller 40 waits until the charge voltages of the flying capacitors Cfly1 and Cfly2 match the target charge voltages.

When it is determined that the charge voltages of the flying capacitors Cfly1 and Cfly2 match the target charge voltages (Yes at step S12), the controller 40 performs the switching operations of the switches SW2 to SW8 in a state in which the input current is limited by the current limiting circuit 11 (step S13). This is because when the target charge voltages correspond to the output voltage and the charge voltages of the flying capacitors Cfly1 and Cfly2 match the target charge voltages, the potential differences between the charge voltages and the output voltage are small, but there may be significant potential differences between the charge voltages and the input voltage. Accordingly, performing the switching operations in a state in which the input current is limited by the current limiting circuit 11 makes it possible to reduce or prevent the occurrence of an inrush current that flows from the input terminal t1 into the capacitive voltage converter 10. For example, the input current can be limited by switching the switch SW1 to the non-conductive state and performing the switching operation of the switch SW8. The charge-and-discharge control of the capacitor Cout1 is performed by performing the switching operations of the switches SW2 to SW8, and the output voltage comes close to the target output voltage.

Next, after the start of the switching operations, the controller 40 determines whether the output voltage detected by the output voltage detector 30 reaches the target output voltage within a predetermined first period (step S14). For example, the controller 40 can determine that the output voltage has reached the target output voltage by receiving, from the output voltage detector 30, a signal indicating that the output voltage has reached the target output voltage.

When the switching operations are performed while the input current is limited, a high thermal load is applied to the current limiting circuit 11. In this state, when any failure occurs in the voltage conversion system 1, the output voltage will not reach the target output voltage, and a high thermal load may be applied to the current limiting circuit 11 for a long period of time. A failure in which the output voltage does not, or is unlikely to, reach the target output voltage is described with reference to FIG. 6.

Figure 6:
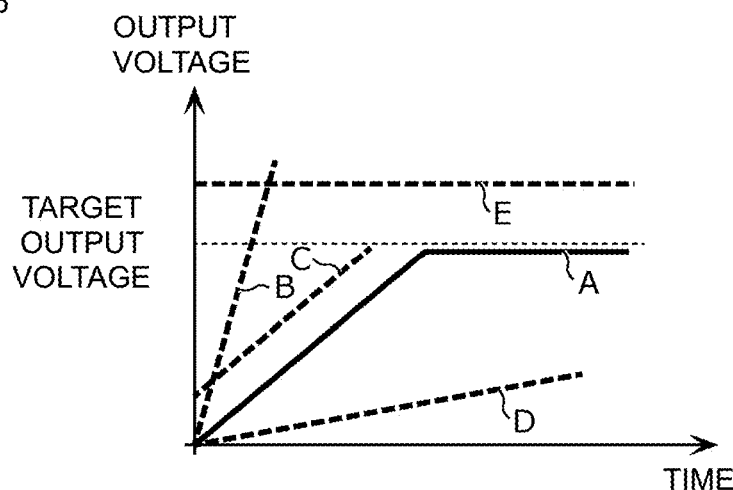
FIG. 6 is a diagram showing examples of temporal variations of an output voltage in a normal state and abnormal states.

FIG. 6 is a diagram showing examples of temporal variations of the output voltage in a normal state and abnormal states.

A waveform A in FIG. 6 indicates a temporal variation of the output voltage in a normal state. The waveform A shows that the output voltage (the charge voltage of the capacitor Cout1) gradually increases and reaches the target output voltage.

A waveform B in FIG. 6 indicates a temporal variation of the output voltage in the case of an open fault. The waveform B shows that the output voltage increases sharply and exceeds the target output voltage.

A waveform C in FIG. 6 indicates a temporal variation of the output voltage observed when an electric charge remains in each capacitor. When an electric charge remains in each capacitor, it is possible to ensure stable activation by performing proper charging and discharging operations before starting the switching operations.

A waveform D in FIG. 6 indicates a temporal variation of the output voltage observed when a short circuit fault occurs, a leak current is large, or the capacitance value of the capacitor Cout1 is abnormal (or large). The waveform D shows that although the output voltage gradually increases, the change rate is small, and the output voltage cannot reach the target output voltage within a predetermined time period.

A waveform E in FIG. 6 indicates a temporal variation of the output voltage observed when a switch failure occurs or the leakage of a switch is large. The waveform E shows that the output voltage is greater than the target output voltage.

When it is determined that the output voltage has not reached the target output voltage within the first period (No at step S14), the controller 40 stops the switching operations (step S17). Stopping the switching operations prevents a high thermal load from being applied to the current limiting circuit 11 for a long period of time.

When it is determined that the output voltage has reached the target output voltage within the first period (Yes at step S14), the controller 40 again determines whether the charge voltages of the flying capacitors Cfly1 and Cfly2 match the target charge voltages (step S15). This second determination is performed to address a case in which a failure occurs in the voltage conversion system 1 when the output voltage reaches the target output voltage within the first period, and the charge voltages of the flying capacitors Cfly1 and Cfly2, which once reached the target charge voltages, do not match the target charge voltages.

When it is determined that the charge voltages of the flying capacitors Cfly1 and Cfly2 do not match the target charge voltages (No at step S15), the controller 40 stops the switching operations (step S17).

When it is determined that the charge voltages of the flying capacitors Cfly1 and Cfly2 match the target charge voltages (Yes at step S15), the controller 40 causes the current limiting circuit 11 to stop limiting the input current (step S16). By canceling the current limitation, it becomes possible to start the normal operation (e.g., supplying power to a load connected to the output terminal t2) of the voltage conversion system 1.

An operation performed until the voltage conversion system 1 starts to perform the normal operation is described with reference to FIG. 7.

Figure 7:
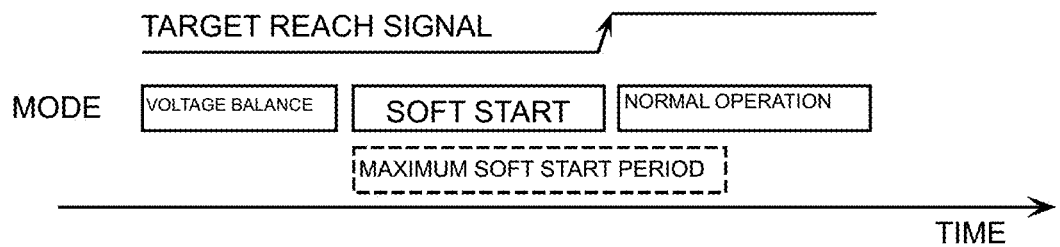
FIG. 7 is a diagram for describing an example of an operation of the voltage conversion system according to the first example embodiment of the present invention.

FIG. 7 is a diagram for describing an example of an operation of the voltage conversion system 1 according to the first example embodiment and schematically illustrates the temporal variation of modes of the voltage conversion system 1.

First, the voltage conversion system 1 transitions to a voltage balance mode to achieve the voltage balance. In the voltage balance mode, the balance circuit 20 performs the charge-and-discharge control of the flying capacitors Cfly1 and Cfly2 in a state in which the switching operations are not being performed such that the charge voltages of the flying capacitors Cfly1 and Cfly2 match the target charge voltages corresponding to the output voltage. In this mode, a target reach signal is not output. The target reach signal is output from the controller 40 to cause the flag terminal t3 to transition to a predetermined state and to notify another voltage conversion system that the voltage conversion system 1 is ready to start the normal operation. In the voltage balance mode, because the voltage conversion system 1 is not ready to start the normal operation, the target reach signal is not output.

When the voltage balance is achieved, that is, when the charge voltages of the flying capacitors Cfly1 and Cfly2 reach the target charge voltages, the voltage conversion system 1 performs a soft start. The soft start indicates performing the switching operations in a state in which the input current is limited by the current limiting circuit 11. Also in this mode, because the voltage conversion system 1 is not ready to start the normal operation, the target reach signal is not output.

FIG. 7 shows that a maximum soft start period is defined to start from the starting point of the soft start in the voltage conversion system 1. The maximum soft start period is an example of the first period. It is determined whether the soft start is completed within the maximum soft start period, i.e., whether the output voltage reaches the target output voltage within the first period.

When the soft start is completed within the maximum soft start period, the voltage conversion system 1 is ready to start the normal operation. Therefore, the target reach signal is output, and the normal operation is started.

For example, the flag terminal t3 is controlled to transition to the predetermined state when the transistor Tr1 is controlled by the target reach signal output from the controller 40. The predetermined state is a state in which the voltage conversion system 1 can start the normal operation. For example, in the predetermined state, the voltage at the flag terminal t3 is high or low. For example, the flag terminal t3 is connected to a power supply via, for example, a pull-up resistor and is caused to transition to the predetermined state, such as "high" or "low", when the transistor Tr1 is controlled. For example, another voltage conversion system connected to the flag terminal t3 may check the state of the flag terminal t3 and thereby determine whether the voltage conversion system 1 is ready to start the normal operation.

In the above example, it is assumed that the target charge voltages correspond to the output voltage. However, the target charge voltages may correspond to the input voltage. In this case, the balance circuit 20 performs the charge-and-discharge control of the flying capacitors Cfly1 and Cfly2 in a state in which the switching operations of switches SW1 to SW8 are not being performed such that the charge voltages of the flying capacitors Cfly1 and Cfly2 match the target charge voltages corresponding to the input voltage. For example, in a Dickson charge pump with a division ratio of 3, the target charge voltage for the charge voltage of the flying capacitor Cfly1 is two thirds of the input voltage (specifically, a voltage within plus or minus several percent (e.g., about 5%) of the voltage that is two thirds of the input voltage), and the target charge voltage for the charge voltage of the flying capacitor Cfly2 is one third of the input voltage (specifically, a voltage within plus or minus several percent (e.g., about 5%) of the voltage that is one third of the input voltage).

Also, in this case, the capacitive voltage converter 10 includes, instead of the current limiting circuit 11, an output-side current limiting circuit that limits the output current flowing from the capacitive voltage converter 10 to the output terminal t2. Then, when it is determined that the charge voltages of the flying capacitors Cfly1 and Cfly2 match the target charge voltages, the controller 40 performs the switching operations in a state in which the output current is limited by the output-side current limiting circuit. This is because when the target charge voltages correspond to the input voltage and the charge voltages of the flying capacitors Cfly1 and Cfly2 match the target charge voltages, the potential differences between the charge voltages and the input voltage are small, but there may be significant potential differences between the charge voltages and the output voltage. Accordingly, it is possible to reduce or prevent the occurrence of an inrush current flowing from the output terminal t2 into the capacitive voltage converter 10 by performing the switching operations in a state in which the output current is limited by the output-side current limiting circuit.

As described above, the voltage conversion system 1 converts the input voltage input to the input terminal t1 into the output voltage to be output from the output terminal t2. The voltage conversion system 1 includes the capacitive voltage converter 10 on a path connecting the input terminal t1 to the output terminal t2 and including at least one flying capacitor (for example the flying capacitors Cfly1 and Cfly2) and multiple switches (for example, the switches SW1 to SW8), the controller 40 configured or programmed to perform switching operations of the multiple switches, and the balance circuit 20 to perform charge-and-discharge control of at least one flying capacitor such that the charge voltage of at least one flying capacitor matches the target charge voltage corresponding to the input voltage or the output voltage. When the charge voltage matches the target charge voltage, the controller 40 is configured or programmed to perform the switching operations of the multiple switches.

Because the charge-and-discharge control of at least one flying capacitor is performed such that the charge voltage of at least one flying capacitor matches the target charge voltage corresponding to the input voltage or the output voltage, the potential difference between the input voltage or the output voltage and the charge voltage of at least one flying capacitor can be reduced. This makes it possible to prevent the occurrence of an inrush current that flows from the input terminal t1 or the output terminal t2 into the capacitive voltage converter 10 when the switching operation is performed. Also, when the capacitive voltage converter 10 includes multiple flying capacitors, the above configuration makes it possible to reduce the potential difference between the multiple flying capacitors and makes it possible to prevent the occurrence of an inrush current that flows between the multiple flying capacitors when the switching operation is performed. Also, because the switching operation is not performed when the charge voltage of at least one flying capacitor does not match the target charge voltage, the occurrence of an inrush current can be prevented. Preventing the occurrence of an inrush current makes it possible to prevent the operation of the capacitive voltage converter 10 from becoming unstable. This also makes it possible to prevent an overvoltage from being applied to internal elements of the capacitive voltage converter 10. Furthermore, because an overvoltage is not applied, the voltage resistance of the internal elements of the capacitive voltage converter 10 can be reduced, and the power density of the capacitive voltage converter 10 can be improved.

For example, the capacitive voltage converter 10 may include an inductive filter connected to the input terminal t1 or the output terminal t2.

The voltage conversion system 1 supplies an electric current to the output terminal t2 by charging and discharging capacitors. However, the charging and discharging results in a loss. Providing the inductive filter makes it possible to reduce the loss resulting from the charging and discharging.

For example, the capacitive voltage converter 10 includes a current limiting circuit that limits the input current flowing from the input terminal t1 to the capacitive voltage converter 10 or the output current flowing from the capacitive voltage converter 10 to the output terminal t2, and the controller 40 may be configured or programmed to perform the switching operation in a state in which the input current or the output current is limited by the current limiting circuit when the charge voltage matches the target charge voltage.

When the target charge voltage corresponds to the input voltage and the charge voltage of at least one flying capacitor matches the target charge voltage, the potential difference between the charge voltage and the input voltage is small, but there may be a significant potential difference between the charge voltage and the output voltage. When the target charge voltage corresponds to the output voltage and the charge voltage of at least one flying capacitor matches the target charge voltage, the potential difference between the charge voltage and the output voltage is small, but there may be a significant potential difference between the charge voltage and the input voltage. Therefore, when the target charge voltage corresponds to the input voltage, it is possible to prevent the occurrence of an inrush current that flows from the output terminal t2 into the capacitive voltage converter 10 by performing the switching operation in a state in which the output current is limited by the output-side current limiting circuit. Also, when the target charge voltage corresponds to the output voltage, it is possible to prevent the occurrence of an inrush current that flows from the input terminal t1 into the capacitive voltage converter 10 by performing the switching operation in a state in which the input current is limited by the current limiting circuit 11.

For example, the voltage conversion system 1 may additionally include the output voltage detector 30 that detects the output voltage, and the controller 40 may be configured or programmed to stop the switching operation when it is determined that the output voltage detected by the output voltage detector 30 has not reached the target output voltage within a predetermined first period after the start of the switching operation.

When the switching operation is performed while the input current or the output current is limited, a high thermal load is applied to the current limiting circuit. In this state, when any failure occurs in the voltage conversion system 1, the output voltage will not reach the target output voltage, and a high thermal load may be applied to the current limiting circuit for a long period of time. For this reason, when the output voltage does not reach the target output voltage within the first period, the switching operation is stopped to prevent a high thermal load from being applied to the current limiting circuit for a long period of time.

For example, the controller 40 may stop the switching operation when the output voltage reaches the target output voltage within the first period, but the charge voltage does not match the target charge voltage.

There is a case in which a failure occurs in the voltage conversion system 1 when the output voltage reaches the target output voltage within the first period, and the charge voltage of at least one flying capacitor, which once reached the target charge voltage, does not match the target charge voltage. In such a case, the switching operation can be stopped.

For example, the controller 40 may cause the current limiting circuit to stop limiting the input current or the output current when the output voltage reaches the target output voltage within the first period.

By canceling the current limitation, it becomes possible to start the normal operation (e.g., supplying power to a load connected to the output terminal t2) of the voltage conversion system 1.

Second Example Embodiment

A second example embodiment is described with reference to FIGS. 8 through 11.

Figure 8:
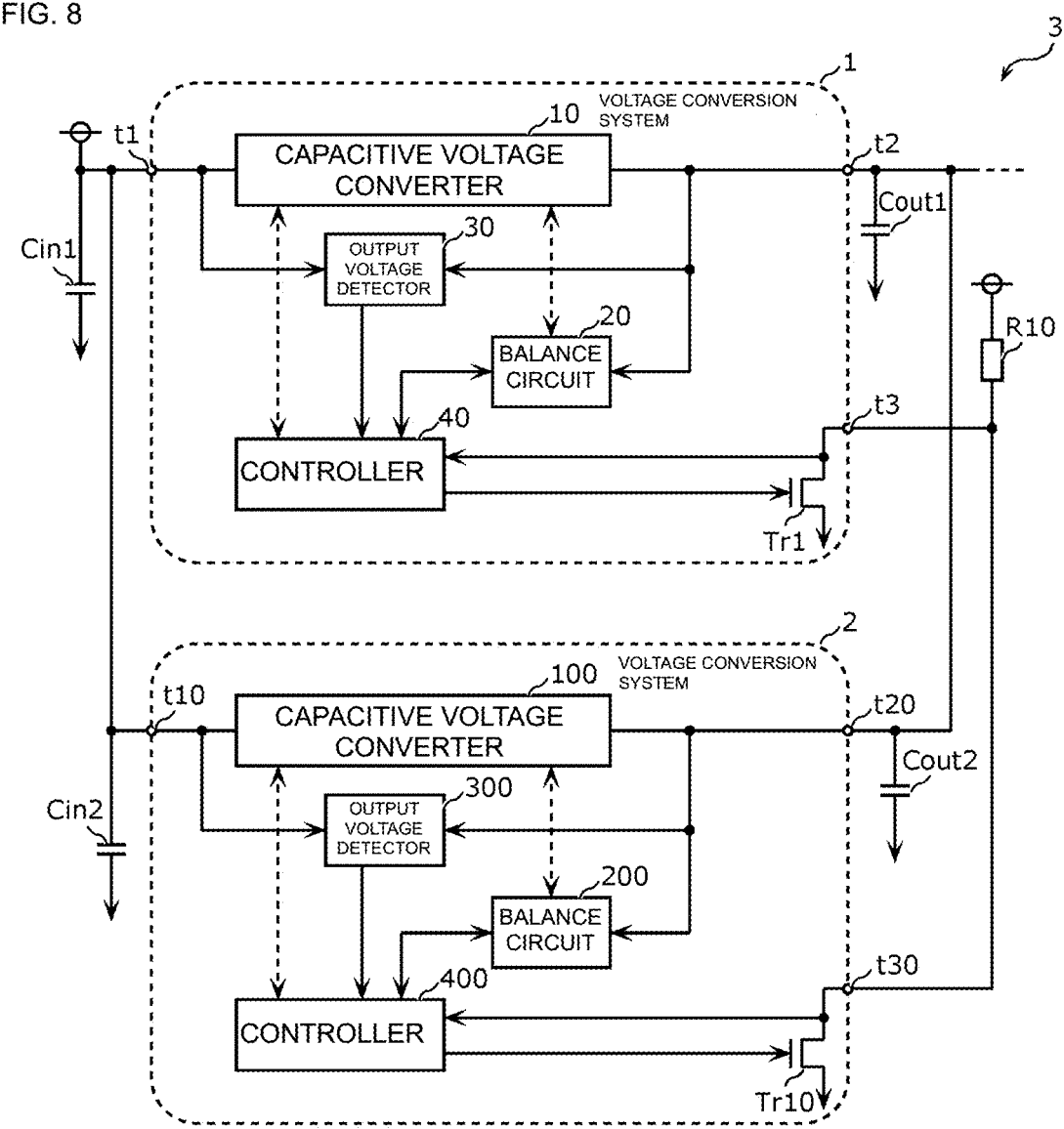
FIG. 8 is a diagram illustrating an example of a power converter system according to a second example embodiment of the present invention.

FIG. 8 is a diagram illustrating an example of a power converter system 3 according to the second example embodiment.

The power converter system 3 includes the voltage conversion system 1 and another voltage conversion system connected in parallel with the voltage conversion system 1. In this example, a voltage conversion system 2 is used as another voltage conversion system. In addition to the voltage conversion systems 1 and 2, the power converter system 3 may include one or more voltage conversion systems connected in parallel with the voltage conversion systems 1 and 2.

Because the voltage conversion system 1 is the same as that described in the first example embodiment, descriptions of the voltage conversion system 1 are omitted here.

The voltage conversion system 2 converts an input voltage input to an input terminal t10 into an output voltage to be output from an output terminal t20 and includes a DC-DC converter, such as a charge pump. For example, the voltage conversion system 2 may be a step-up converter that outputs an output voltage obtained by increasing an input voltage or may be a step-down converter that outputs an output voltage obtained by decreasing an input voltage. The voltage conversion system 2 includes a capacitive voltage converter 100, a balance circuit 200, an output voltage detector 300, a controller 400, an input terminal t10, an output terminal t20, and a flag terminal t30. Furthermore, the voltage conversion system 2 includes a transistor Tr10.

The input terminal t10 is connected to, for example, a direct-current power source and receives an input voltage. A capacitor Cin2 is charged to the input voltage.

The output terminal t20 is connected to, for example, a load, and an output voltage is output from the output terminal t20. A capacitor Cout2 is charged to the output voltage.

The flag terminal t30 is connected to, for example, the voltage conversion system 1.

The transistor Tr10 is provided on a path connecting the flag terminal t30 to the ground. The transistor Tr10 is, for example, a MOSFET the gate of which is connected to the controller 400. The transistor Tr10 controls the flag terminal t30 to transition to a predetermined state.

The input terminal t1 is connected to the input terminal t10, the output terminal t2 is connected to the output terminal t20, and the flag terminal t3 is connected to the flag terminal t30. As a result of connecting the terminals to each other in this way, the voltage conversion system 1 and the voltage conversion system 2 are connected in parallel with each other. The flag terminals t3 and t30 are connected to a power supply via a resistor R10. The resistor R10 is, for example, a pull-up resistor.

The voltage conversion system 2 has substantially the same functions as those of the voltage conversion system 1, and the capacitive voltage converter 100, the balance circuit 200, the output voltage detector 300, and the controller 400 also have substantially the same functions as the capacitive voltage converter 10, the balance circuit 20, the output voltage detector 30, and the controller 40. Therefore, descriptions of these components are omitted here.

With the voltage conversion systems 1 and 2 connected in parallel with each other, it is possible to supply a higher power to a load compared with a case in which the voltage conversion system 1 is used alone.

Next, an operation of the voltage conversion system 1 in the power converter system 3 is described with reference to FIG. 9.

Figure 9:
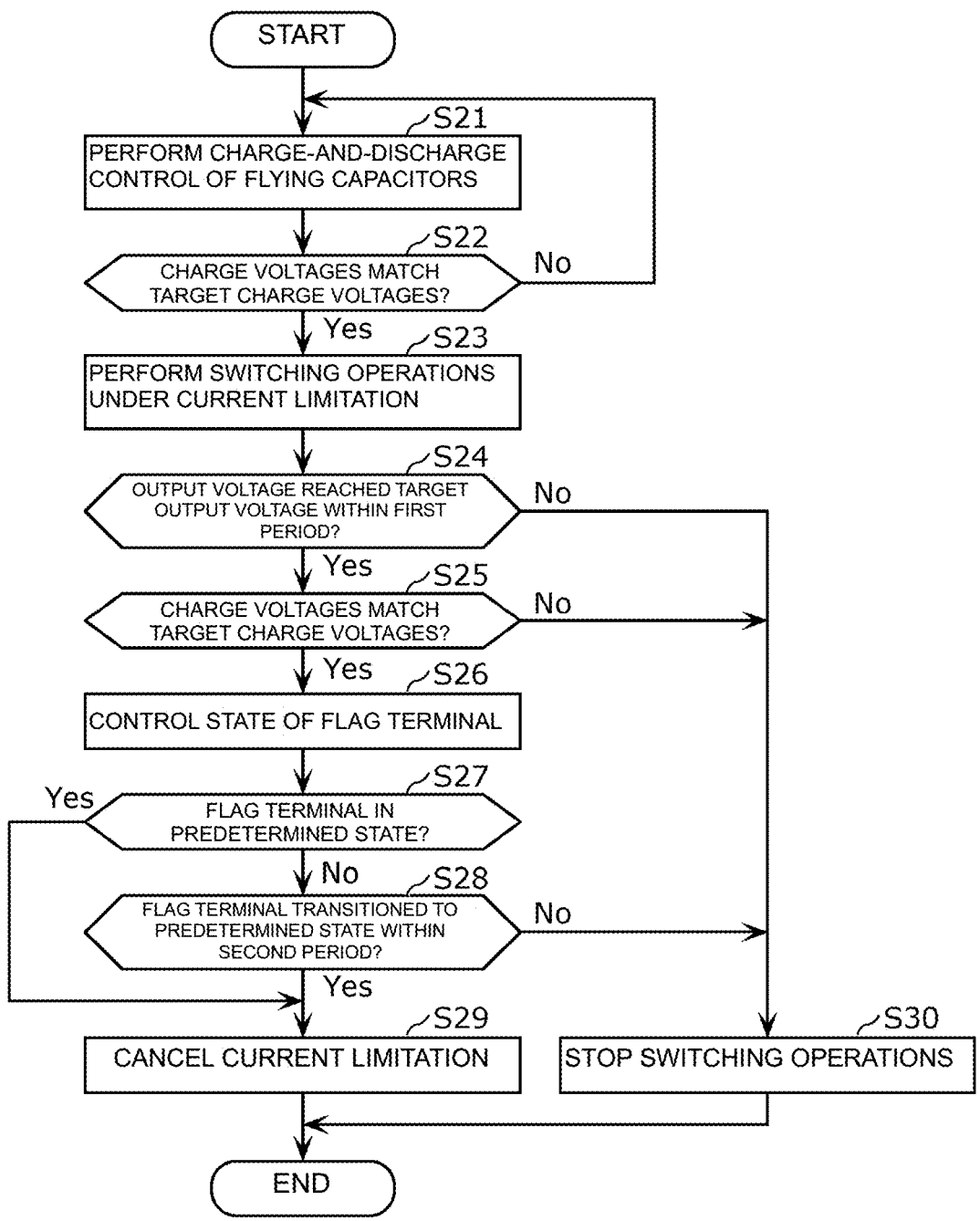
FIG. 9 is a flowchart illustrating an example of an operation of a voltage conversion system according to the second example embodiment of the present invention.

FIG. 9 is a flowchart illustrating an example of an operation of the voltage conversion system 1 according to the second example embodiment.

Because step S21 to step S25 are the same as step S11 to step S15 described with reference to FIG. 5, descriptions of these steps are omitted.

When it is determined that the output voltages have reached the target output voltages within the first period (Yes at step S24) and the charge voltages match the target charge voltages (Yes at step S25), the controller 40 is configured or programmed to control the flag terminal t3 to transition to a predetermined state (step S26). Here, there is a case in which the flag terminal t3 does not transition to the predetermined state even when the flag terminal t3 is controlled to transition to the predetermined state. This is because the flag terminal t3 is connected to the flag terminal t30 and cannot transition to the predetermined state unless the flag terminal t30 is also in the predetermined state. For example, even when the transistor Tr1 is switched from the conductive state to the non-conductive state to cause the flag terminal t3 to transition to a high state, if the transistor Tr10 remains in the conductive state and the flag terminal t30 is in a low state, the flag terminal t3 connected to the flag terminal t30 also remains in the low state and does not transition to the high state.

Next, the controller 40 determines whether the flag terminal t3 has transitioned to the predetermined state after controlling the flag terminal t3 to transition to the predetermined state (step S27). When the flag terminal t3 is in the predetermined state, the flag terminal t30 is also in the predetermined state, that is, the voltage conversion system 2 is also ready to start a normal operation. When the flag terminal t3 is not in the predetermined state, the flag terminal t30 is not in the predetermined state, that is, the voltage conversion system 2 is not ready to start the normal operation.

When it is determined that the flag terminal t3 has not transitioned to the predetermined state (No at step S27), the controller 40 is configured or programmed to determine whether the flag terminal t3 transitions to the predetermined state within a predetermined second period, which is longer than the first period, after the start of the switching operation (step S28). When the flag terminal t3 does not transition to the predetermined state after being controlled to transition to the predetermined state, the flag terminal t30 of the voltage conversion system 2 has not transitioned to the predetermined state, and the voltage conversion system 2 is not ready to start the normal operation. In this case, the flag terminal t30 of the voltage conversion system 2 will not transition to the predetermined state even after the first period, and the switching operations of the voltage conversion system 1 may be stopped. Accordingly, in such a case, it is possible to prevent the switching operations of the voltage conversion system 1 from being stopped before the voltage conversion system 2 becomes ready to start the normal operation by determining whether the flag terminal t3 transitions to the predetermined state within the second period longer than the first period.

For example, the second period may be determined based on the time required for the charge voltages of the flying capacitors Cfly1 and Cfly2 to reach the target charge voltages. Specifically, the second period may be obtained by adding, to the first period, the time required for the charge voltages of the flying capacitors Cfly1 and Cfly2 to reach the target charge voltages.

When it is determined that the flag terminal t3 has not transitioned to the predetermined state within the second period (No at step S28), the controller 40 stops the switching operations (step S30). The switching operations are stopped when the flag terminal t3 has not transitioned to the predetermined state within the second period because it is probable that there is a failure in the voltage conversion system 2.

When it is determined that the flag terminal t3 has transitioned to the predetermined state (Yes at step S27) or when it is determined that the flag terminal t3 has transitioned to the predetermined state within the second period (Yes at step S28) after the flag terminal t3 is controlled to transition to the predetermined state, the controller 40 causes the current limiting circuit to stop limiting the input current or the output current (step S29). Thus, when both of the voltage conversion systems 1 and 2 become ready to start normal operations, the current limitation is canceled so that the voltage conversion systems 1 and 2 can start the normal operations.

The charge-discharge rate of the flying capacitors Cfly1 and Cfly2 in the voltage conversion system 1 may be higher than the charge-discharge rate at which the output voltage of the voltage conversion system 2 is caused to reach the target output voltage. This is because if the charge voltages of the flying capacitors of the voltage conversion system 2 reach the target charge voltages and the switching operations in the voltage conversion system 2 are started before the charge voltages of the flying capacitors Cfly1 and Cfly2 of the voltage conversion system 1 reach the target charge voltages corresponding to the output voltage and if the charge-discharge rate of the flying capacitors Cfly1 and Cfly2 of the voltage conversion system 1 is lower than the charge-discharge rate at which the output voltage of the voltage conversion system 2 is caused to reach the target output voltage, the changes in the charge voltages of the flying capacitors Cfly1 and Cfly2 of the voltage conversion system 1 will not be able to keep up with the changes in the output voltage. Accordingly, the charge-discharge rate of the flying capacitors Cfly1 and Cfly2 of the voltage conversion system 1 is made higher than the charge-discharge rate at which the output voltage of the voltage conversion system 2 is caused to reach the target output voltage so that the changes in the charge voltages of the flying capacitors Cfly1 and Cfly2 of the voltage conversion system 1 can keep up with the changes in the output voltage.

Here, operations performed before the voltage conversion systems 1 and 2 start the normal operations are described with reference to FIGS. 10 and 11.

Figure 10:
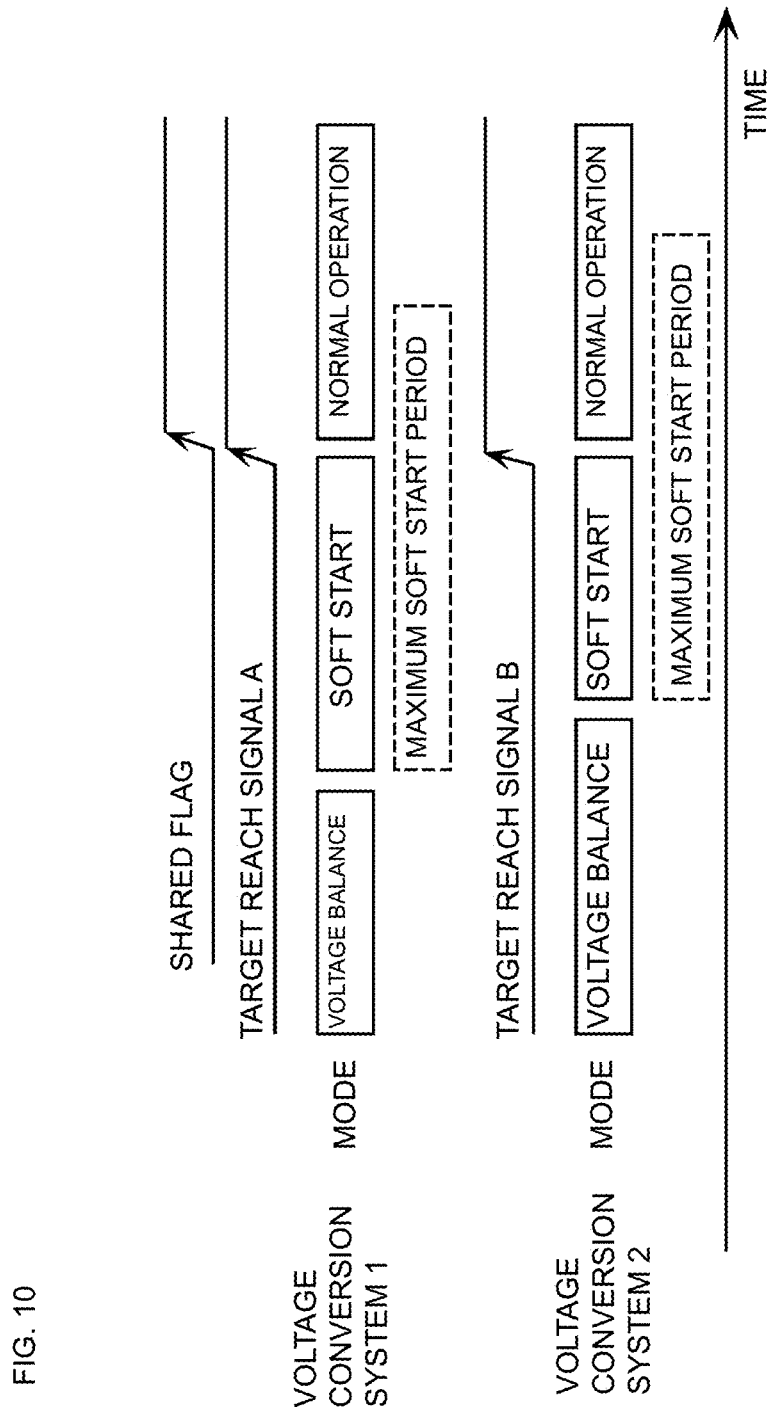
FIG. 10 is a diagram for describing an example of an operation of the power converter system according to the second example embodiment of the present invention.

FIG. 10 is a diagram for describing an example of an operation of the power converter system 3 according to the second example embodiment and schematically illustrates the temporal variation of modes of the voltage conversion systems 1 and 2.

First, each of the voltage conversion systems 1 and 2 transitions to a voltage balance mode. At this stage, a target reach signal (hereafter referred to as a target reach signal A) is not output because the voltage conversion system 1 is not ready to start the normal operation, and a target reach signal (hereafter referred to as a target reach signal B) is not output because the voltage conversion system 2 is not ready to start the normal operation.

For example, the voltage conversion system 1 achieves the voltage balance before the voltage conversion system 2 and performs a soft start. At this stage, because the voltage conversion system 1 is not ready to start the normal operation, the target reach signal A is not output. Then, the voltage conversion system 2 achieves the voltage balance and performs a soft start. Even at this stage, because the voltage conversion system 2 is still not ready to start the normal operation, the target reach signal B is not output.

FIG. 10 shows that the maximum soft start period is defined to start from the starting point of the soft start in each of the voltage conversion systems 1 and 2. For each of the voltage conversion systems 1 and 2, it is determined whether the soft start is completed within the corresponding maximum soft start period, i.e., whether the output voltage reaches the target output voltage within the first period.

When the soft start is completed within the corresponding maximum soft start period in each of the voltage conversion systems 1 and 2 and the voltage conversion systems 1 and 2 become ready to start the normal operations, the target reach signals A and B are output, and a shared flag is turned on. The shared flag indicates that both of the flag terminals t3 and t30 are in the predetermined state. Because the shared flag is turned on, the voltage conversion systems 1 and 2 start the normal operations.

Figure 11:
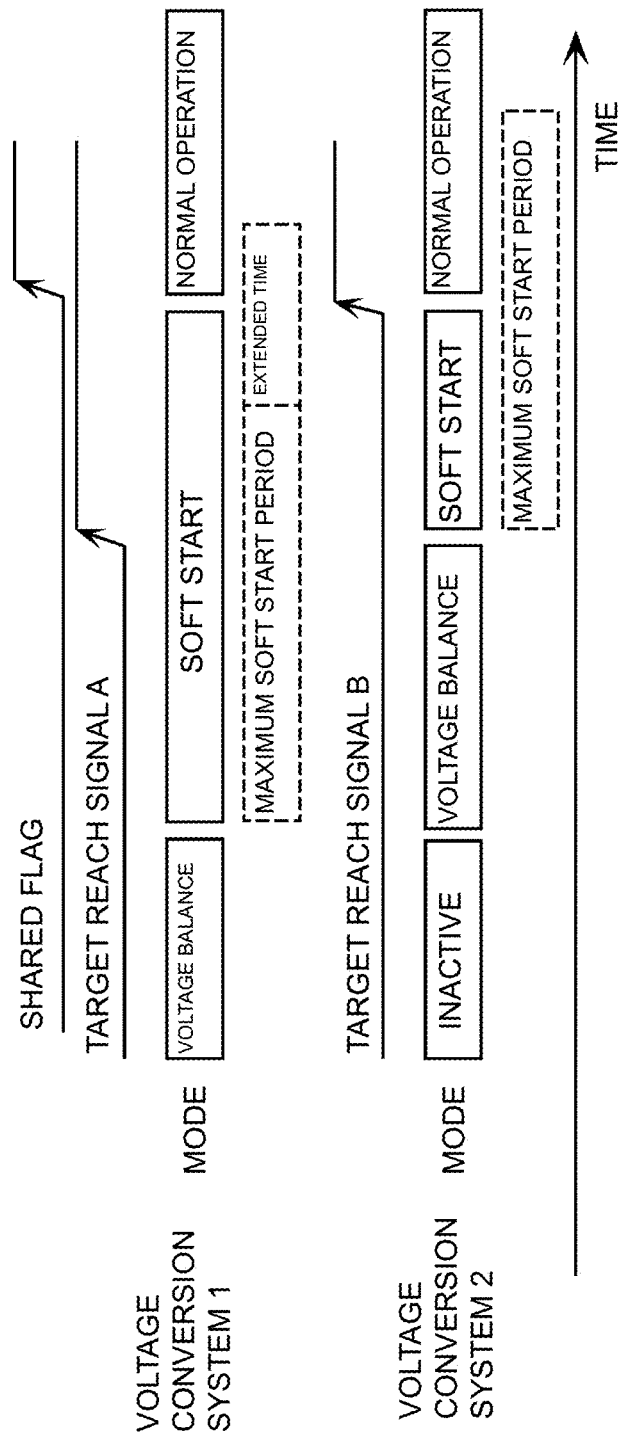
FIG. 11 is a diagram for describing another example of an operation of the power converter system according to the second example embodiment of the present invention.

FIG. 11 is a diagram for describing another example of an operation of the power converter system 3 according to the second example embodiment and schematically illustrates the temporal variation of modes of the voltage conversion systems 1 and 2.

First, the voltage conversion system 1 transitions to a voltage balance mode. At this stage, because the voltage conversion system 1 is not ready to start the normal operation, the target reach signal A is not output. In this example, it is assumed that the voltage conversion systems 1 and 2 are activated at different times, and the voltage conversion system 2 is still inactive.

The voltage conversion system 1 achieves the voltage balance and performs a soft start. Even at this stage, because the voltage conversion system 1 is still not ready to start the normal operation, the target reach signal A is not output.

FIG. 11 shows that a maximum soft start period is defined to start from the starting point of the soft start in the voltage conversion system 1. For the voltage conversion system 1, it is determined whether the soft start is completed within the corresponding maximum soft start period, i.e., whether the output voltage reaches the target output voltage within the first period.

The voltage conversion system 2 transitions to the voltage balance mode after the voltage conversion system 1. At this stage, because the voltage conversion system 2 is not ready to start the normal operation, the target reach signal B is not output.

When the soft start is completed within the corresponding maximum soft start period in the voltage conversion system 1 and the voltage conversion system 1 becomes ready to start the normal operation, the target reach signal A is output. However, because the target reach signal B has not been output, the shared flag is not turned on. Therefore, the maximum soft start period of the voltage conversion system 1 is extended. The time obtained by adding the extended amount of time to the maximum soft start period is an example of the second period. It is determined whether the shared flag is turned on within the extended maximum soft start period, i.e., whether the flag terminal t3 transitions to the predetermined state within the second period.

The voltage conversion system 2 achieves the voltage balance and performs a soft start. Even at this stage, because the voltage conversion system 2 is still not ready to start the normal operation, the target reach signal B is not output.

FIG. 11 shows that a maximum soft start period is defined to start from the starting point of the soft start in the voltage conversion system 2. For the voltage conversion system 2, it is determined whether the soft start is completed within the corresponding maximum soft start period, i.e., whether the output voltage reaches the target output voltage within the first period.

When the soft start is completed within the corresponding maximum soft start period in the voltage conversion system 2 and the voltage conversion system 2 becomes ready to start the normal operation, the target reach signal B is output. Because the target reach signal B is output within the extended maximum soft start period (the second period), the shared flag is turned on, and the voltage conversion systems 1 and 2 start the normal operations.

As described above, the input terminal t1 is connected to the input terminal t10 of another voltage conversion system (e.g., the voltage conversion system 2), the output terminal t2 is connected to the output terminal t20 of the other voltage conversion system, the voltage conversion system 1 includes the flag terminal t3, and the flag terminal t3 is connected to the flag terminal t30 of the other voltage conversion system. When the output voltage reaches the target output voltage within the first period, the controller 40 controls the flag terminal t3 to transition to the predetermined state.

Thus, with multiple voltage conversion systems connected in parallel with each other, it is possible to supply a higher power compared with a case in which the voltage conversion system 1 is used alone. Also, it is possible to notify another voltage conversion system that the voltage conversion system 1 is ready to start the normal operation by controlling the flag terminal t3 to transition to the predetermined state.

For example, the controller 40 may be configured or programmed to determine whether the flag terminal t3 has transitioned to the predetermined state after controlling the flag terminal t3 to transition to the predetermined state, to determine whether the flag terminal t3 transitions to the predetermined state within the predetermined second period, which is longer than the first period, after the start of the switching operations when it is determined that the flag terminal t3 has not transitioned to the predetermined state, and to stop the switching operations when it is determined that the flag terminal t3 has not transitioned to the predetermined state within the second period.

When the flag terminal t3 does not transition to the predetermined state after being controlled to transition to the predetermined state, the flag terminal of another voltage conversion system has not transitioned to the predetermined state, and the other voltage conversion system is not ready to start the normal operation. In this case, the flag terminal of the other voltage conversion system will not transition to the predetermined state even after the first period, and the switching operations of the voltage conversion system 1 may be stopped. In such a case, it is possible to prevent the switching operations of the voltage conversion system 1 from being stopped before the other voltage conversion system becomes ready to start the normal operation by determining whether the flag terminal t3 transitions to the predetermined state within the second period longer than the first period. Here, when the flag terminal t3 has not transitioned to the predetermined state within the second period, the switching operation is stopped because it is suspected that there is a failure in the other voltage conversion system.

For example, the second period may be determined based on the time required for the charge voltage to reach the target charge voltage.

For example, the second period may be obtained by adding, to the first period, the time required for the charge voltage of at least one flying capacitor to reach the target charge voltage.

For example, the controller 40 may cause the current limiting circuit to stop limiting the input current or the output current when determining that the flag terminal t3 has transitioned to the predetermined state after controlling the flag terminal t3 to transition to the predetermined state or when determining that the flag terminal t3 has transitioned to the predetermined state within the second period.

When all of the voltage conversion systems become ready to start the normal operations, the current limitation is cancelled, and all of the voltage conversion systems can start the normal operations.

For example, the charge-discharge rate of at least one flying capacitor may be higher than the charge-discharge rate at which the output voltage of the other voltage conversion system is caused to reach the target output voltage.

When the charge voltage of at least one flying capacitor of the other voltage conversion system reaches the target charge voltage and the switching operations in the other voltage conversion system are started before the charge voltage of at least one flying capacitor of the voltage conversion system 1 reaches the target charge voltage corresponding to the output voltage and if the charge-discharge rate of at least one flying capacitor of the voltage conversion system 1 is lower than the charge-discharge rate at which the output voltage of the other voltage conversion system is caused to reach the target output voltage, the change in the charge voltage of at least one flying capacitor of the voltage conversion system 1 will not be able to keep up with the change in the output voltage. For this reason, the charge-discharge rate of at least one flying capacitor of the voltage conversion system 1 is made higher than the charge-discharge rate at which the output voltage of the other voltage conversion system is caused to reach the target output voltage so that the change in the charge voltage of at least one flying capacitor of the voltage conversion system 1 can keep up with the change in the output voltage.

A summary of the case in which multiple voltage conversion systems are connected in parallel with each other is provided below.

As described in the second example embodiment, when voltage conversion systems (charge pumps) are connected in parallel with each other, a potential difference is generated even between the charge pumps, and an inrush current between the charge pumps is more likely to be generated. For example, when a flying capacitor of a voltage conversion system is being charged and a charge pump of another voltage conversion system is being discharged, an inrush current between the charge pumps of the voltage conversion systems becomes more likely to be generated. For example, an inrush current between charge pumps tends to be generated when, for example, voltage conversion systems are started at different times or the states of the voltage conversion systems in an inactive state are different from each other.

For the above reasons, to synchronize the operations of the voltage conversion systems, when a first voltage conversion system of the voltage conversion systems is ready to start the normal operation but a second voltage conversion system of the voltage conversion systems is not ready to start the normal operation, the normal operation of the first voltage conversion system is not started. This enables the voltage conversion systems to start the normal operations at the same time.

For example, to enable the voltage conversion systems to start the normal operations at the same time, information indicating that the voltage conversion systems are ready to start the normal operations is shared by using, for example, an open drain output.

However, while a first voltage conversion system, which has become ready to start the normal operation first, waits until a second voltage conversion system becomes ready to start the normal operation, the maximum soft start period of the first voltage conversion system may expire, and the first voltage conversion system may become unable to start the normal operation. Also, for example, even if the second voltage conversion system becomes ready to start the normal operation while the first voltage conversion system is restarting, the maximum soft start period of the second voltage conversion system may expire before the restarting first voltage conversion system becomes ready to start the normal operation. That is, the starting cycle may be repeated forever.

For the above reason, in a system in which multiple voltage conversion systems are connected in parallel with each other, when one of the voltage conversion systems becomes ready to start the normal operation, the maximum soft start period is extended. This makes it possible to stably start the normal operations of the voltage conversion systems even when, for example, the voltage conversion systems differ from each other or the initial states of the voltage conversion systems differ from each other.

Here, it is also possible to set a long maximum soft start period as a default. In this case, however, a high thermal load may be applied to the current limiting circuit when, for example, a failure occurs in a voltage conversion system. On the other hand, extending the maximum soft start period after a voltage conversion system becomes ready to start the normal operation is not likely to cause a problem because the charging has been completed and the thermal load is low in the voltage conversion system. For this reason, the maximum soft start period is extended after the voltage conversion system becomes ready to start the normal operation instead of setting a long maximum soft start period as a default.

Other Example Embodiments

The voltage conversion system 1 and the power converter system 3 according to the example embodiments of the present invention are described above. However, the present invention is not limited to the above-described example embodiments. The present invention may also include other example embodiments implemented by combining components in the above example embodiments, variations obtained by making various modifications conceivable by a person skilled in the art to the above example embodiments without departing from the spirit of the present invention, and various apparatuses including the voltage conversion system 1 and the power converter system 3 of the present invention.

For example, although the capacitive voltage converter 10 of the above example embodiments includes a current limiting circuit, the current limiting circuit may be omitted.

For example, although the capacitive voltage converter 10 of the above example embodiments includes an inductive filter, the inductive filter may be omitted.

For example, in the above example embodiments, when determining that the output voltage has reached the target output voltage within the first period, the controller 40 further determines whether the charge voltage of at least one flying capacitor matches the target charge voltage. However, the controller 40 may be configured or programmed to not determine whether the charge voltage of at least one flying capacitor matches the target charge voltage. That is, step S15 in FIG. 5 may be omitted, and the controller 40 may cause the current limiting circuit to stop limiting the input current or the output current when determining that the output voltage has reached the target output voltage within the first period. Similarly, step S25 in FIG. 9 may be omitted, and the controller 40 may control the flag terminal t3 to transition to the predetermined state when determining that the output voltage has reached the target output voltage within the first period.

For example, in the above example embodiments, the controller 40 determines whether the charge voltage of at least one flying capacitor matches the target charge voltage. However, the controller 40 may be configured or programmed to not perform this determination. For example, this determination may be performed by a component other than the controller 40, and the controller 40 may be configured or programmed to obtain a result of the determination performed by the component other than the controller 40 and perform various types of control according to the obtained result of the determination.

For example, in the above example embodiments, the controller 40 determines whether the output voltage detected by the output voltage detector 30 reaches the target output voltage within the predetermined first period after the start of the switching operation. However, the controller 40 may be configured or programmed to not perform this determination. For example, this determination may be performed by a component other than the controller 40, and the controller 40 may be configured or programmed to obtain a result of the determination performed by the component other than the controller 40 and perform various types of control according to the obtained result of the determination.

For example, in the above example embodiments, the voltage conversion system 1 includes the output voltage detector 30. However, the output voltage detector 30 may be omitted.

For example, example embodiments of the present invention may be implemented not only as the voltage conversion system 1 but also as a voltage conversion method including steps (processes) performed by the components included in the voltage conversion system 1.

Specifically, the voltage conversion method is performed by a voltage conversion system that converts an input voltage input to an input terminal into an output voltage to be output from an output terminal. The voltage conversion system includes a capacitive voltage converter provided on a path connecting the input terminal to the output terminal and including at least one flying capacitor and multiple switches. The voltage conversion method includes, as illustrated in FIG. 5, a step (step S11) of performing charge-and-discharge control of at least one flying capacitor such that a charge voltage of at least one flying capacitor matches a target charge voltage corresponding to the input voltage or the output voltage and a step (step S13) of performing switching operations of the multiple switches when the charge voltage matches the target charge voltage (Yes at step S12).

In the voltage conversion method, the voltage conversion system further includes an output voltage detector that detects the output voltage, the capacitive voltage converter includes a current limiting circuit that limits an input current flowing from the input terminal to the capacitive voltage converter or an output current flowing from the capacitive voltage converter to the output terminal, the input terminal is connected to an input terminal of another voltage conversion system, the output terminal is connected to an output terminal of the other voltage conversion system, the voltage conversion system further includes a flag terminal, and the flag terminal is connected to a flag terminal of the other voltage conversion system. In the voltage conversion method, as illustrated in FIG. 9, in the step (step S23) of performing the switching operations, when the charge voltage matches the target charge voltage (Yes at step S22), the switching operations are performed in a state in which the input current or the output current is limited by the current limiting circuit. The voltage conversion method may further include a step (step S30) of stopping the switching operations when the output voltage detected by the output voltage detector does not reach the target output voltage within a predetermined first period after the start of the switching operations (No at step S24) and a step (step S26) of controlling the flag terminal to transition to a predetermined state when the output voltage reaches the target output voltage within the first period (Yes at step S24).

The voltage conversion method may further include a step of determining whether the flag terminal has transitioned to the predetermined state after controlling the flag terminal to transition to the predetermined state (step S27), a step of determining whether the flag terminal transitions to the predetermined state within a predetermined second period, which is longer than the first period, after the start of the switching operations (step S28) when it is determined that the flag terminal has not transitioned to the predetermined state (No at step S27), and a step of stopping the switching operations (step S30) when it is determined that the flag terminal has not transitioned to the predetermined state within the second period (No at step S28).

For example, the voltage conversion method may be performed by a computer (or a computer system). Also, according to an example embodiment of the present invention, the steps included in the voltage conversion method can be implemented as a program to be executed by a computer. Furthermore, an example embodiment of the present invention can provide a non-transitory computer-readable storage medium, such as a CD-ROM, storing the program.

For example, when an example embodiment of the present invention is implemented by a program (software), the above steps are performed by executing the program using hardware resources, such as a CPU, a memory, and an input-output circuit, of a computer. That is, the CPU acquires data from, for example, the memory or the input-output circuit, performs calculations, and outputs calculation results to the memory or the input-output circuit to perform the above steps.

Components included in the voltage conversion system 1 and the power converter system 3 of the above example embodiments may be implemented by integrated circuits (IC) such as large scale integration (LSI) circuits.

The integrated circuits are not limited to LSI circuits and may be implemented by dedicated circuits or general-purpose processors. Also, programmable FPGAs or reconfigurable processors, in which connections and settings of circuit cells in an LSI circuit are reconfigurable, may be used.

Furthermore, when new integration technology, which replaces LSI, is developed as a result of advances in the semiconductor technology or based on derivative technology, components included in the voltage conversion system 1 and the power converter system 3 may be integrated using the new integration technology.

Example embodiments of the present invention can be widely used for various devices as voltage conversion systems that output an output voltage obtained by converting an input voltage.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A voltage conversion system to convert an input voltage input to an input terminal into an output voltage to be output from an output terminal, the voltage conversion system comprising:
 a capacitive voltage converter on a path connecting the input terminal to the output terminal and including at least one flying capacitor and multiple switches;
 a controller configured or programmed to perform switching operations of the multiple switches; and
 a balance circuit to perform charge-and-discharge control of the at least one flying capacitor such that a charge voltage of the at least one flying capacitor matches a target charge voltage corresponding to the input voltage or the output voltage; wherein
 the controller is configured or programmed to perform the switching operations of the multiple switches when the charge voltage matches the target charge voltage.

2. The voltage conversion system according to claim 1, wherein the capacitive voltage converter includes an inductive filter connected to the input terminal or the output terminal.

3. The voltage conversion system according to claim 1, wherein
 the capacitive voltage converter includes a current limiting circuit to limit an input current flowing from the input terminal to the capacitive voltage converter or an output current flowing from the capacitive voltage converter to the output terminal; and
 when the charge voltage matches the target charge voltage, the controller is configured or programmed to perform the switching operations in a state in which the input current or the output current is limited by the current limiting circuit.

4. The voltage conversion system according to claim 3, further comprising:
 an output voltage detector to detect the output voltage; wherein
 when the output voltage detected by the output voltage detector does not reach a target output voltage within a predetermined first period after a start of the switching operations, the controller is configured or programmed to stop the switching operations.

5. The voltage conversion system according to claim 4, wherein when the output voltage reaches the target output voltage within the first period, but the charge voltage does not match the target charge voltage, the controller is configured or programmed to stop the switching operations.

6. The voltage conversion system according to claim 4, wherein when the output voltage reaches the target output voltage within the first period, the controller is configured or programmed to cause the current limiting circuit to stop limiting the input current or the output current.

7. The voltage conversion system according to claim 4, wherein
 the input terminal is connected to an input terminal of another voltage conversion system;
 the output terminal is connected to an output terminal of the another voltage conversion system;
 the voltage conversion system further comprises a flag terminal that is connected to a flag terminal of the another voltage conversion system; and
 when the output voltage reaches the target output voltage within the first period, the controller is configured or programmed to control the flag terminal to transition to a predetermined state.

8. The voltage conversion system according to claim 7, wherein
 the controller is configured or programmed to:
  determine whether the flag terminal has transitioned to the predetermined state after controlling the flag terminal to transition to the predetermined state;
  determine whether the flag terminal transitions to the predetermined state within a predetermined second period, which is longer than the first period, after the start of the switching operations when it is determined that the flag terminal has not transitioned to the predetermined state; and
  stop the switching operations when it is determined that the flag terminal has not transitioned to the predetermined state within the second period.

9. The voltage conversion system according to claim 8, wherein the second period is determined based on a time required for the charge voltage to reach the target charge voltage.

10. The voltage conversion system according to claim 8, wherein the controller is configured or programmed to cause the current limiting circuit to stop limiting the input current or the output current when it is determined that the flag terminal has transitioned to the predetermined state after the flag terminal is controlled to transition to the predetermined state or when it is determined that the flag terminal has transitioned to the predetermined state within the second period.

11. The voltage conversion system according to claim 7, wherein a charge-discharge rate of the at least one flying capacitor is higher than a charge-discharge rate at which an output voltage of the another voltage conversion system is caused to reach the target output voltage.

12. A power converter system comprising:
 the voltage conversion system according to claim 7; and
 the another voltage conversion system.

13. The power converter system according to claim 12, wherein
 the controller is configured or programmed to:
  determine whether the flag terminal has transitioned to the predetermined state after controlling the flag terminal to transition to the predetermined state;
  determine whether the flag terminal transitions to the predetermined state within a predetermined second period, which is longer than the first period, after the start of the switching operations when it is determined that the flag terminal has not transitioned to the predetermined state; and
  stop the switching operations when it is determined that the flag terminal has not transitioned to the predetermined state within the second period.

14. The power converter system according to claim 13, wherein the second period is determined based on a time required for the charge voltage to reach the target charge voltage.

15. The power converter system according to claim 13, wherein the controller is configured or programmed to cause the current limiting circuit to stop limiting the input current or the output current when it is determined that the flag terminal has transitioned to the predetermined state after the flag terminal is controlled to transition to the predetermined state or when it is determined that the flag terminal has transitioned to the predetermined state within the second period.

16. The power converter system according to claim 12, wherein a charge-discharge rate of the at least one flying capacitor is higher than a charge-discharge rate at which an output voltage of the another voltage conversion system is caused to reach the target output voltage.

17. A voltage conversion method performed by a voltage conversion system to convert an input voltage input to an input terminal into an output voltage to be output from an output terminal, the voltage conversion system including a capacitive voltage converter on a path connecting the input terminal to the output terminal and including at least one flying capacitor and multiple switches, the voltage conversion method comprising:
   performing charge-and-discharge control of the at least one flying capacitor such that a charge voltage of the at least one flying capacitor matches a target charge voltage corresponding to the input voltage or the output voltage; and
   performing switching operations of the multiple switches when the charge voltage matches the target charge voltage.

18. The voltage conversion method according to claim 17, wherein
   the voltage conversion system further includes an output voltage detector to detect the output voltage;
   the capacitive voltage converter includes a current limiting circuit to limit an input current flowing from the input terminal to the capacitive voltage converter or an output current flowing from the capacitive voltage converter to the output terminal;
   the input terminal is connected to an input terminal of another voltage conversion system;
   the output terminal is connected to an output terminal of the another voltage conversion system;
   the voltage conversion system further includes a flag terminal that is connected to a flag terminal of the another voltage conversion system;
   in the performing the switching operations, when the charge voltage matches the target charge voltage, the switching operations are performed in a state in which the input current or the output current is limited by the current limiting circuit;
   the voltage conversion method further comprises:
   stopping the switching operations when the output voltage detected by the output voltage detector does not reach a target output voltage within a predetermined first period after a start of the switching operations; and
   controlling the flag terminal to transition to a predetermined state when the output voltage reaches the target output voltage within the first period.

19. The voltage conversion method according to claim 18, further comprising:
   determining whether the flag terminal has transitioned to the predetermined state after controlling the flag terminal to transition to the predetermined state;
   determining whether the flag terminal transitions to the predetermined state within a predetermined second period, which is longer than the first period, after the start of the switching operations when it is determined that the flag terminal has not transitioned to the predetermined state; and
   stopping the switching operations when it is determined that the flag terminal has not transitioned to the predetermined state within the second period.

\* \* \* \* \*